March 4, 1969 L. W. BORG 3,431,357

TONE CONTROL

Filed Aug. 9, 1965

INVENTOR
LESTER W. BORG

BY

Mueller, Aichele & Rauner

ATTYS.

United States Patent Office 3,431,357

Patented Mar. 4, 1969

3,431,357

TONE CONTROL

Lester W. Borg, Arlington Heights, Ill., assignor to Motorola, Inc., Franklin Park, Ill., a corporation of Illinois Filed Aug. 9, 1965, Ser. No. 478,166
U.S. Cl. 179—1 3 Claims
Int. Cl. H04m *1/00;* H03h *5/00*

ABSTRACT OF THE DISCLOSURE

A tone control for a ceramic cartridge is provided by increasing the load on the ceramic cartridge to decrease the bass response while at the same time the impedance of a path between the ceramic cartridge and an audio amplifier for treble signals is decreased to increase the treble response. In a like manner decreasing the load on the cartridge to increase the bass response also acts to increase the impedance of the treble signal path between the ceramic cartridge and the audio amplifier.

Figure 1:
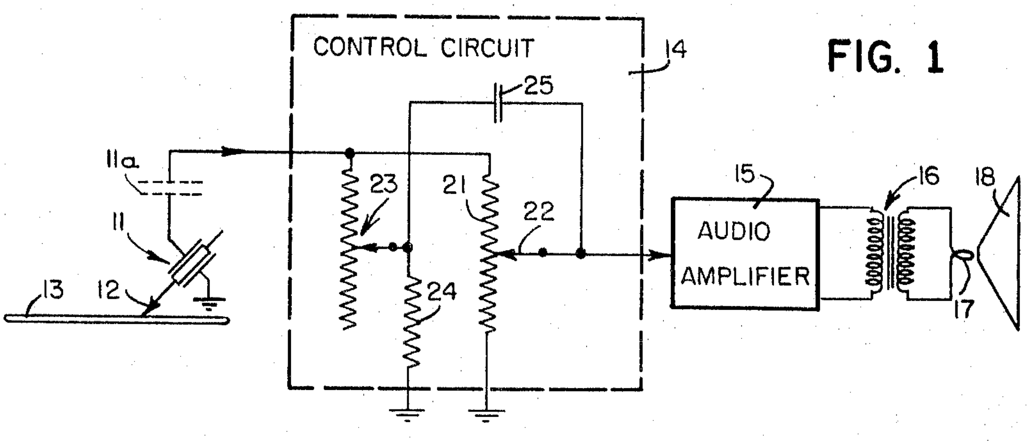

Ceramic phonograph pickup cartridges and ceramic microphones are often used as the signal source in audio reproduction systems. It is possible to provide a bass tone control in a system using such devices by taking advantage of the fact that ceramic signal sources, such as ceramic phonograph cartridges and ceramic microphones, exhibit a variation in bass response in accordance with the load which is placed thereon. This is because of the high internal capacitance of such sources and results in a decrease in bass response with increased loading, and vice versa. Such a tone control may consist merely of a variable resistor connected across the source to vary the loading thereof.

A problem is presented by such systems, however, when it is desired to achieve treble tone control as well as bass tone control. A variable resistor and a capacitor connected across the source will provide variation in the treble response of the circuit by providing a variable impedance shunt path for treble signals. Such a treble tone control, however, also varies the loading on the source and consequently, as the impedance of the treble circuit is decreased to decrease the treble response, there is a simultaneous increase of load on the source and an undesirable decrease in the bass response with the treble response.

It is an object of this invention to provide an improved control circuit for an audio reproduction system.

Another object of the invention is to provide a tone control for an audio reproduction system utilizing a ceramic signal source wherein bass response may be decreased as treble response is increased, and vice versa.

Still another object of the invention is to provide a tone control of the foregoing characteristics utilizing a single variable resistor.

A feature of the invention is the provision of a tone control having a variable resistance portion and a fixed resistance portion connected across a source of audio signals with the junction of the two resistance portions being connected to the audio amplifier through a capacitor.

Another feature of the invention is the provision of a control circuit having a volume control comprising a resistor connected across the source with a variable tap connected to the amplifier, and further having a tone control comprising a variable resistor and a fixed resistor connected across the source with a capacitor connecting the junction between the two last named resistors to the audio amplifier.

Figure 2:
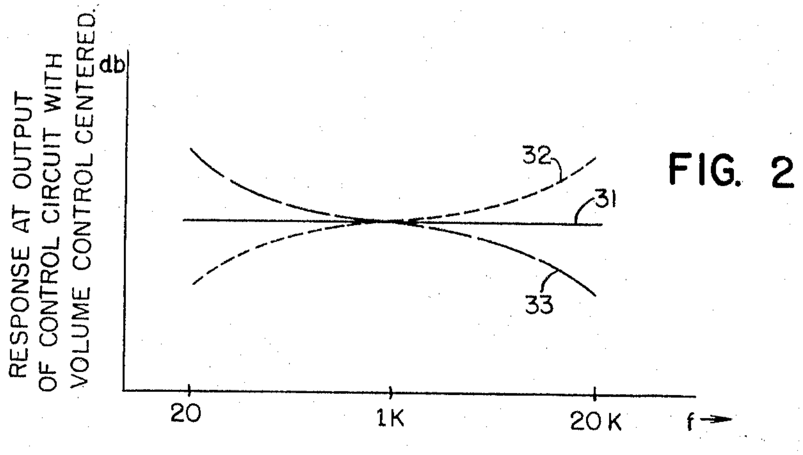
Figure 3:
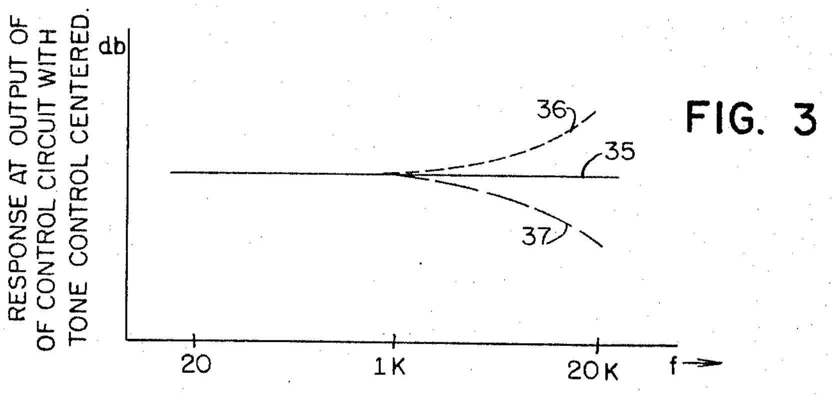

In the drawing:

FIG. 1 is a schematic diagram of an audio reproduction system incorporating a control circuit in accordance with the invention; and FIGS. 2 and 3 are graphs illustrating the characteristics of the control circuit of FIG. 1.

The invention comprises a control circuit for controlling signals applied to an audio signal amplifier from a source of audio signals having a bass response which drops with increasing load and vice versa. Such a source might be a ceramic phonograph pickup cartridge or a ceramic microphone. The control circuit includes a volume control comprised of a resistor connected across the source and having a variable tap connected to the amplifier to vary the strength of signals applied thereto. The control circuit further includes a tone control comprising a variable resistance portion and a fixed resistance portion series connected across the source. The variable resistance portion cooperates with the fixed resistance portion to provide variation in bass response by varying the load on the effective series capacitance of the source. The tone control further comprises a capacitance portion connecting the junction between the variable resistance portion and the fixed resistance portion to the amplifier. The variable resistance portion and the capacitance portion form a path for treble signals and operate to decrease the impedance of the control circuit to treble signals when the bass response of the control circuit is decreased by increased load, and vice versa.

Referring now to FIG. 1, the invention is shown used in an audio reproduction system having a ceramic phonograph cartridge pickup 11 which produces an electrical output due to the vibration of the stylus 12 caused by variations in the grooves on the phonograph record 13. The electrical signals produced in pickup 11 are coupled by a control circuit 14 to an audio amplifier 15. A transformer 16 couples the output of the amplified signals produced by amplifier 15 to the voice coil 17 of speaker 18. Speaker 18 then reproduces such signals as sound. Control circuit 14 includes a volume control comprised of a resistor 21 connected across the source of signals 11. The volume control has a variable tap 22 which may be moved up and down along the resistor 21 to vary the strength of signals applied to the amplifier 15.

As is known in the art, certain devices, such as ceramic pickup 11 or a ceramic microphone, exhibit a variation in bass response with a variation in load placed thereupon. This is attributable to the fact that such devices have considerable effective internal series capacitance and, accordingly, their internal impedance will vary with frequency. It is possible to take advantage of this fact by providing a tone control which varies the load on the source 11. This will provide for a variation in the bass response of the system. To this end, a variable resistor 23 and a fixed resistor 24 are series connected across the source 11. As the variable tap or resistor 23 is moved upwards, reducing the value of the resistor, the load is increased and the bass response of the system decreases since more of the bass frequencies will appear across the series capacitance of pickup 11 represented as capacitance 11*a*.

The particular characteristics of the source 11 present a problem when it is desired to also provide variation in treble response. This is because a conventional treble control might comprise a capacitor and a variable resistor connected in series with each other across the source to provide a variable impedance shunt for the treble signals. Variation in impedance of such a treble tone control circuit also varies the load on source 11. Accordingly, if the impedance of the treble tone control circuit were decreased to decrease the treble response, the load on source 11 would increase accordingly, decreasing bass response as well. This is an undesirable effect.

A capacitor 25 is connected from the junction between variable resistor 23 and resistor 24 to the amplifier 15. As a result, the variable resistor 23 will provide variation in treble response as well as bass response. This is because, as the resistance of variable resistor 23 is decreased to increase the load on the souce 11 and reduce the bass response, the treble response of the control circuit 14 will be increased by virtue of the high frequency shunting path of capacitor 25. Thus, variable resistor 23 cooperates with capacitor 25 to vary the impedance of the control circuit 14 to treble signals with variation in bass response. As variable resistor 23 is increased, bass response is accordingly increased and treble response is decreased due to the higher impedance in the shunt circuit.

The effect of the tone control may be observed from FIG. 2 which is a theoretical approximation and is not intended to be a quantitative demonstration of system response. In FIG. 2, the solid line 31 represents a perfectly flat response and would be the case with variable resistors 23 and variable tap 22 set exactly in the middle of their respective ranges. As the variable resistor 23 is decreased, the result is shown by the dotted line 32 and will fall off in bass response and increased treble response may be observed. The opposite effect results when the resistance of variable resistor 23 is increased and is shown by the dash line 33 in FIG. 2. As may be seen from this latter line, the bass response is increased while the treble response is decreased.

A further advatnage occurs with the control circuit of the invention in connection with variation of the volume control. As volume is increased, the human ear tends to sense an even greater increase in high frequency signals than actually takes place. Conversely, as volume is decreased the human ear tends to sense an even greater fall off in the treble signals than actually occurs. Thus in FIG. 3, where the solid line 35 represents the theoretical response for a middle setting of a variable tap 22 on resistor 21, it may be seen that response is of a flat nature. When the variable tap 22 is moved down toward the low end of resistor 21, the treble response tends to increase slightly as exhibited by the dotted line 36. Conversely, as volume control variable tap 22 is moved upwardly toward the high end of resistor 21, a slight fall off in treble response occurs as shown by the line 37. Thus, the response of the human ear is compensated by control circuit 14.

It may, therefore, be seen that the invention provides an improved control circuit for use in an audio reproduction system wherein variation of the treble and bass response in opposite directions occurs simultaneously. Thus, both treble and bass response may be set in a desired relation by variation of a single control.

I claim:

1. In combination, a source of audio signals having a bass response which decreases with increasing load and a control circuit for controlling the application of said signals to an audio signal amplifier, said control circuit including in combination, a volume control comprising resistor means connected across the source and having a variable tap connected to the input of the amplifier to vary the strength of signals applied thereto, and a tone control comprised of a variable resistance portion and a fixed resistance portion connected to said variable resistance portion, said variable and fixed resistance portions being series connected across the source, said variable resistance portion cooperating with said fixed resistance portion to provide variation in bass response by varying the load on the source, said tone control further comprising a capacitor connecting the junction between said variable resistance portion and said fixed resistance portion to said amplifier input, said variable resistance portion and said capacitance portion forming a path for treble signals and operating to decrease the impedance of said control circuit to treble signals as the bass response thereof is decreased by increased load on the source and further operating to increase the impedance of said control circuit to treble signals as the bass response thereof is increased by decreased load on the source.

2. In combination, a source of audio signals having a bass response which decreases with increasing load and a control circuit for controlling the application of said signals to an audio signal amplifier, said control circuit including in combination, a volume control comprising a first resistor connected across the source and having a variable tap connected to the input of the amplifier to vary the strength of signals applied thereto, and a tone control comprising a variable resistor connected to the source and having a variable tap thereon and a second resistor connected between said variable tap of said variable resistor and the source, said variable resistor cooperating with said second resistor to provide variation in bass response by varying the load on the source, said tone control further comprising a capacitor connecting said variable tap of said variable resistor to the input of the amplifier, said variable resistor and said capacitor forming a path for treble signals and operating to vary the impedance of said control circuit to treble signals as the bass response thereof is varied by variation in source load.

3. A sound reproduction system including in combination, speaker means, an amplifier connected to said speaker means for driving the same, a ceramic cartridge and means for exciting the same to produce an electrical output, a volume control comprising a resistor connected across said ceramic cartridge and having a variable tap connected to the input of said amplifier to vary the strength of signals applied thereto from said cartridge, and a tone control comprising a variable resistor connected to the source and having a variable tap thereon and a fixed resistor connected between said variable tap of said variable resistor and said cartridge, said variable resistor cooperating with said fixed resistor to provide variation in bass response by varying the load on said cartridge, said tone control further comprising a capacitor connecting said variable tap of said variable resistor to the input of said amplifier, said variable resistor and said capacitor forming a path for treble signals from said cartridge to said amplifier and operating to vary the impedance of said control circuit to treble signals passing therethrough as the bass response thereof is varied by variation in the load on said ceramic cartridge.

References Cited

UNITED STATES PATENTS

| | | | |
|---|---|---|---|
| 2,029,523 | 2/1936 | Curtis | 333—28 |
| 2,144,565 | 1/1939 | Dreisbach. | |
| 2,411,190 | 11/1946 | Brown | 179—1.2 |

KATHLEEN H. CLAFFY, *Primary Examiner.*

R. P. TAYLOR, *Assistant Examiner.*

U.S. Cl. X.R.

333—28